UNITED STATES PATENT OFFICE.

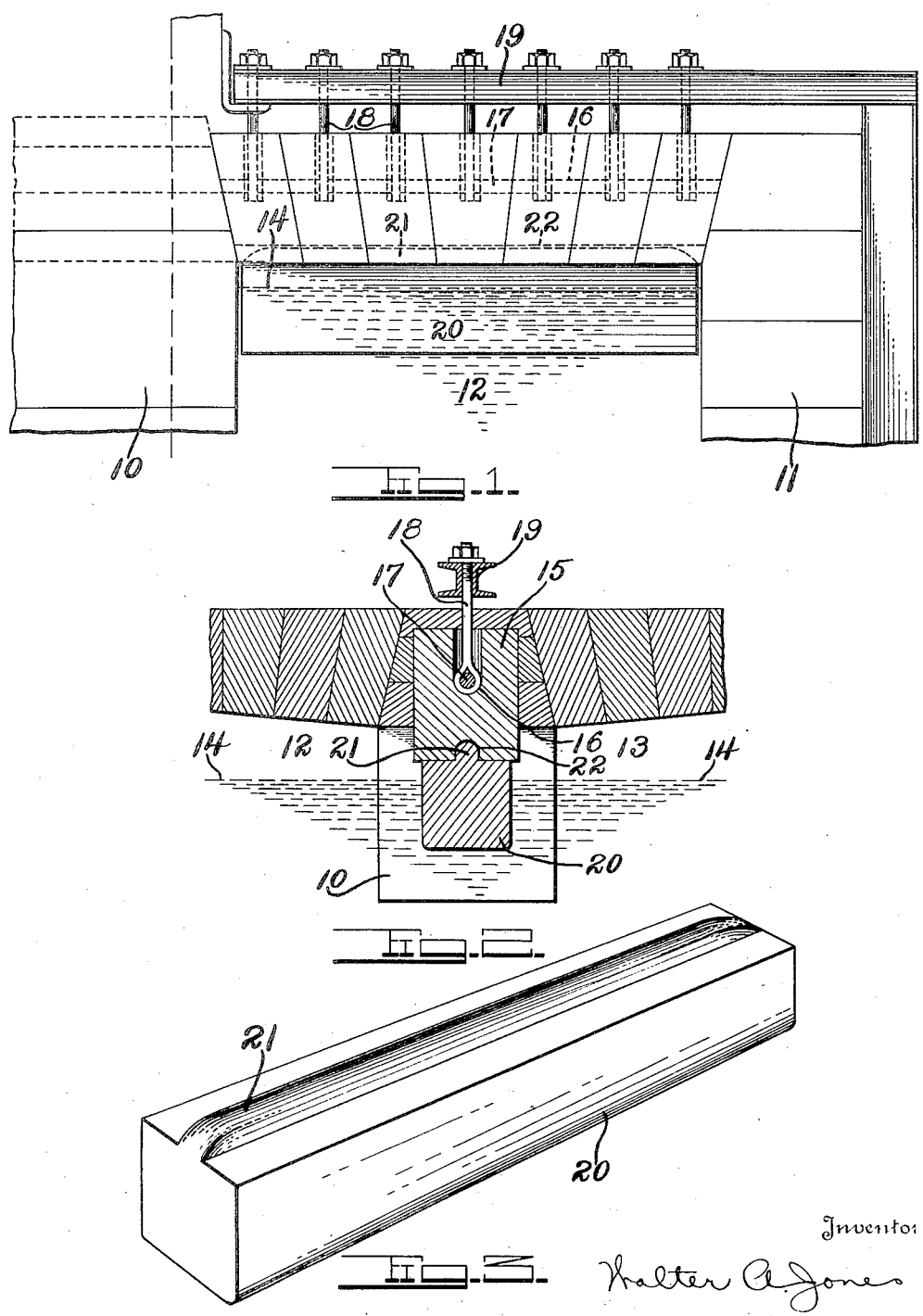

WALTER A. JONES, OF MORGANTOWN, WEST VIRGINIA.

GLASS-DRAWING TANK.

1,321,752.　　　　　Specification of Letters Patent.　　Patented Nov. 11, 1919.

Application filed December 21, 1915. Serial No. 68,020.

*To all whom it may concern:*

Be it known that I, WALTER A. JONES, a citizen of the United States, residing at Morgantown, in the county of Monongalia and State of West Virginia, have invented new and useful Improvements in Glass-Drawing Tanks, of which the following is a specification.

This invention is an improved partition arch for twin glass tanks.

In the operation of twin glass tanks it is desirable to maintain communication between the respective chambers, to permit of the free flow of molten glass, but care must be taken to prevent too free a sweep of the flames from the source of heat, over the surface of the molten glass and particularly from one chamber to the other. The object of the invention is to provide simple and improved means, whereby the proper flow of molten glass may be maintained, without in any manner affecting the temperature thereof, and the sweep of the flames from one chamber to the other may be prevented.

The invention will be hereinafter fully set forth and particularly pointed out in the claims.

In the accompanying drawing:—

Figure 1 is a side elevation, partly in section of a twin tank with the invention applied thereto. Fig. 2 is a transverse sectional view on the line 2—2 Fig. 1. Fig. 3 is a detail perspective view of the buoyant division wall.

Referring to the drawing, 10 designates the rear wall, and 11 the front wall of a tank having the twin chambers 12 and 13 for receiving molten glass, the level of which is indicated at 14. The two chambers are divided by a partition wall 15, of suitable material, provided with a longitudinal recess 16 in which is anchored a longitudinally disposed supporting rod 17, which is engaged by hangers 18, suspended from a beam 19 supported in suitable manner from the walls of the tank.

In order to prevent the flames from sweeping over the surface of the molten glass from one chamber to the other, during a drawing operation, a buoyant division wall 20 is provided, the same being constructed of refractory clay, or other suitable material, and provided with a longitudinal rib 21 on its upper surface, arranged to engage a complemental groove 22, formed in the lower face of the partition wall 15.

In practice when it is desired to draw a cylinder, or the like from either chamber 12 or 13, the buoyant member 20 is moved under the partition wall 15, until it is in a position for the rib 21 to enter the groove 22, whereupon the buoyant wall 20 is held against lateral displacement, and forms a barrier to prevent flames sweeping over the molten glass in one chamber, from passing to the other chamber. At the same time the molten glass may pass beneath the buoyant division wall, and flow freely from one chamber to the other.

Having thus explained the nature of my invention and described an operative manner of constructing and using the same, although without attempting to set forth all of the forms in which it may be made, or all of the forms of its use, what I claim is:—

1. An improvement in glass drawing tanks comprising communicating twin drawing chambers, a partition wall located between said chambers above the level of the molten glass, and a buoyant division wall removably held in contact with said partition wall by the molten glass to prevent sweep of flames from either chamber to the other during a drawing operation from the latter.

2. An improvement in glass drawing tanks comprising communicating twin drawing chambers, a partition wall between said chambers above the level of the molten glass, and a buoyant division wall removably held in contact with said partition wall by the molten glass to prevent sweep of flames from either chamber to the other during a drawing operation from the latter, said partition wall and said division wall being provided with complemental means for preventing relative lateral displacement.

3. An improvement in glass drawing tanks comprising communicating twin drawing chambers, a partition wall between said chambers above the level of the molten glass, said partition wall having a longitudinal groove in its bottom face, and a buoyant division wall having a longitudinal rib complemental to said groove and held in engagement therewith by the molten glass.

4. An improvement in glass drawing tanks comprising communicating twin drawing chambers, a partition wall for dividing said chambers, means located outside of the tank to which said partition wall is suspended in a position over the division line between said chambers above the level of the molten glass, and a division wall capable of floating on the molten glass and held in engagement with said partition wall by the said molten glass.

5. An improvement in glass drawing tanks comprising communicating twin drawing chambers, an external support, a partition wall provided with a longitudinal chamber, a supporting rod anchored in said chamber, suspension means depending from said support and engaging said supporting rod for suspending said partition wall in a position over the division line between the communicating chambers above the level of the molten glass, and a division wall capable of floating on the molten glass and held in engagement with said partition wall by the said molten glass.

In testimony whereof I have hereunto set my hand in presence of two subscribing witnesses.

WALTER A. JONES.

Witnesses:
 GEO. C. STEELE,
 JO. L. KEENER.